Figure 1:
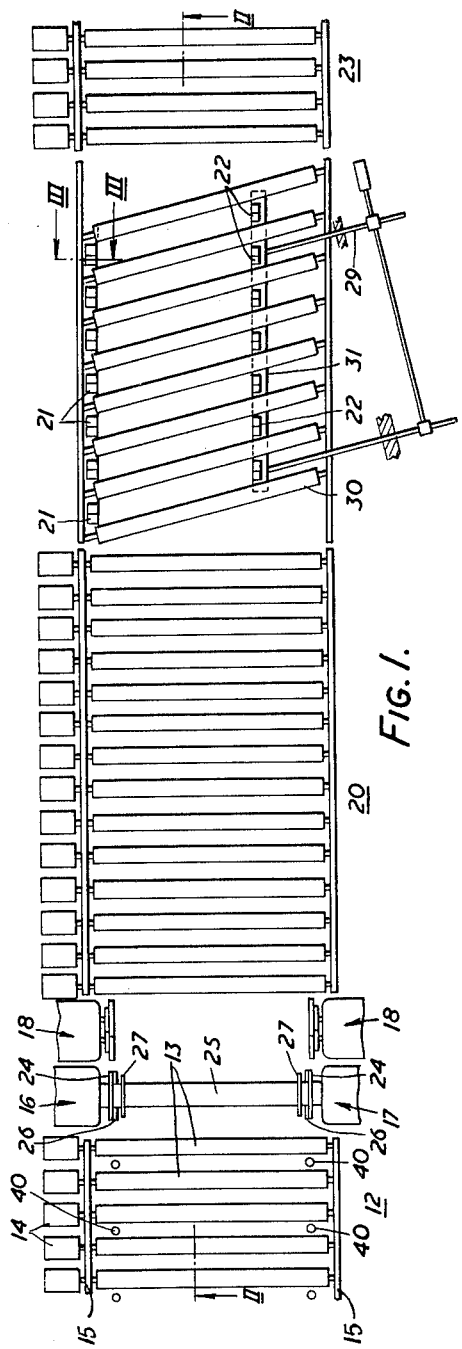

April 19, 1966  R. B. SIMS  3,247,029
SHEET METAL

Filed Oct. 2, 1963  2 Sheets-Sheet 1

INVENTOR
RAYMOND B. SIMS

BY
ATTORNEY

United States Patent Office 3,247,029
Patented Apr. 19, 1966

3,247,029
SHEET METAL
Raymond Bernard Sims, Sheffield, England, assignor to Davy and United Engineering Company Limited, Sheffield, England, a British company
Filed Oct. 2, 1963, Ser. No. 314,835
Claims priority, application Great Britain, Nov. 25, 1959, 40,006/59
7 Claims. (Cl. 148—12)

This application is a continuation-in-part of my application Serial No. 71,078, now abandoned, filed November 22, 1960.

My invention relates to the cutting, or trimming of sheet steel emanating in long lengths from plate or strip mills. The steels with which my invention are primarily concerned are carbon steels and alloy steels, including ferritic and martensitic stainless steels, containing carbon in the range of 0.05% to 0.80%.

At present metal plate stock as delivered from a rolling mill frequently has variations in its width over its length, deviations from a straight run-out, and convexes and/or concave edges. In addition, it has a tendency to crack at the edges. The plates from the rolling mill are flattened, allowed to cool sufficiently for close visual inspection and marked to indicate the position of defects. The plates are then checked to ascertain the maximum width of defect-free rectangular plate that can be obtained from each rolled plate and in particular, whether a strip of a width required by the customer's order can be cut from the plate. Thereafter, each plate is trimmed by a pair of spaced rotary cutters, are to set the width of the customer's order or by a guillotine shear, or by gas cutting. While for a particular plant layout the temperature at which the plates are trimmed may vary substantially, a normal temperature for cutting the plate is of the order of 200° centigrade.

I have found that the trimming of plate by rotary trimmers or by a guillotine causes the edges of the final strip to become work-hardened. It is this work-hardening of the edges which restricts the mechanical operations that can be performed on the plate after the edge trimming, and which gives rise to fracturing of the plate should it be flattened by roller levellers after trimming. It also limits the thickness that can be cut by rotary cutters and guillotines to about ¾" and 1¼" respectively; above this thickness the work-hardening becomes excessive and the stresses set up in bending the plate during subsequent fabrication are so large as to cause fracturing of the work-hardened material.

In my invention, immediately after the mechanical cutting of the sheet, the sheet is subjected to a heating operation, which is limited to the cut edge or edges, and which has the effect of recrystallising the iron in the work-hardened areas and thereby of rendering the edges more ductile.

The work-hardened portions of the sheet are preferably raised to a sub-critical temperature of 550° C. to 750° C., because I have found that the recrystallisation I require can be achieved without elevating the sheet edges above the critical temperature; on the other hand the heating step may be achieved at temperature above the critical point if desired.

It is important to heat treat the cut edge or edges of the sheet immediately after the trimming operation. If there is a long delay between the two operations, the sheet becomes age hardened and the previously work-hardened edges of the sheet crack.

Preferably the cut edge or each cut edge of the sheet is continuously subject to heat treatment by a flame or an induction heater as the sheet moves away from the trimmers. The edges are preferably elevated to recrystallisation temperature to a depth of up to 0.5 inch.

By applying the invention to plate stock in continuous lengths, the stresses engendered in the plate are released and the work-hardening is reduced. As a result, plate cut by rotary shears can be subsequently worked more satisfactorily, and in addition, rotary shears can be used for cutting plate of greater thicknesses than previously which in certain cases has amounted to the shearing capacity being increased from ¾" up to at least 1¼" thick plate. The invention can also be applied to the cutting of plate by guillotines, in which case, the upper limit of plate thickness that can be accommodated by the guillotine is increased.

The plate is preferably trimmed at a temperature of between 300 and 400° C. since in this temperature range less bending of the plate, and hence less work-hardening, occurs than at lower temperatures. However, trimming at such elevated temperatures is not always possible and the present invention, by relieving the stresses set up by work-hardening, avoids the need to trim at specific temperatures.

The method at present employed for determining the strip of maximum width that can be trimmed from a plate is cumbersome and is by no means satisfactory in practice and, in accordance with another aspect of the invention, apparatus for use in the cutting of sheet metal comprises a number of nozzles for discharging a fluid, which nozzles are adjustable so as to be positionable adjacent the strip face along the line it is desired to cut. Provided that it is possible to cut along the desired line, all the nozzles become at least partially closed by the sheet; however, if, because of the shape of the sheet, it is impossible to cut along the desired line, one or more of the nozzles is free to discharge the fluid and this serves as an indication that cutting along that line cannot be effective.

Figure 2:
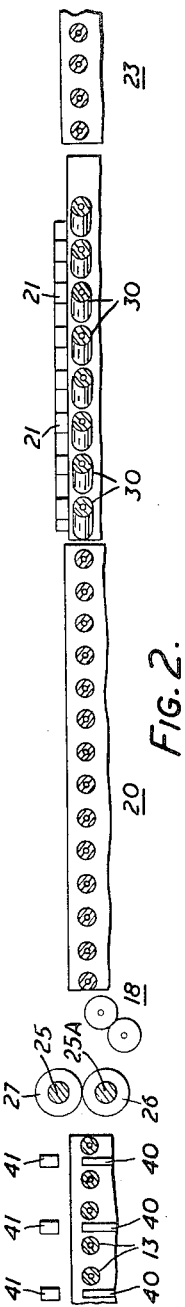
Figure 3:
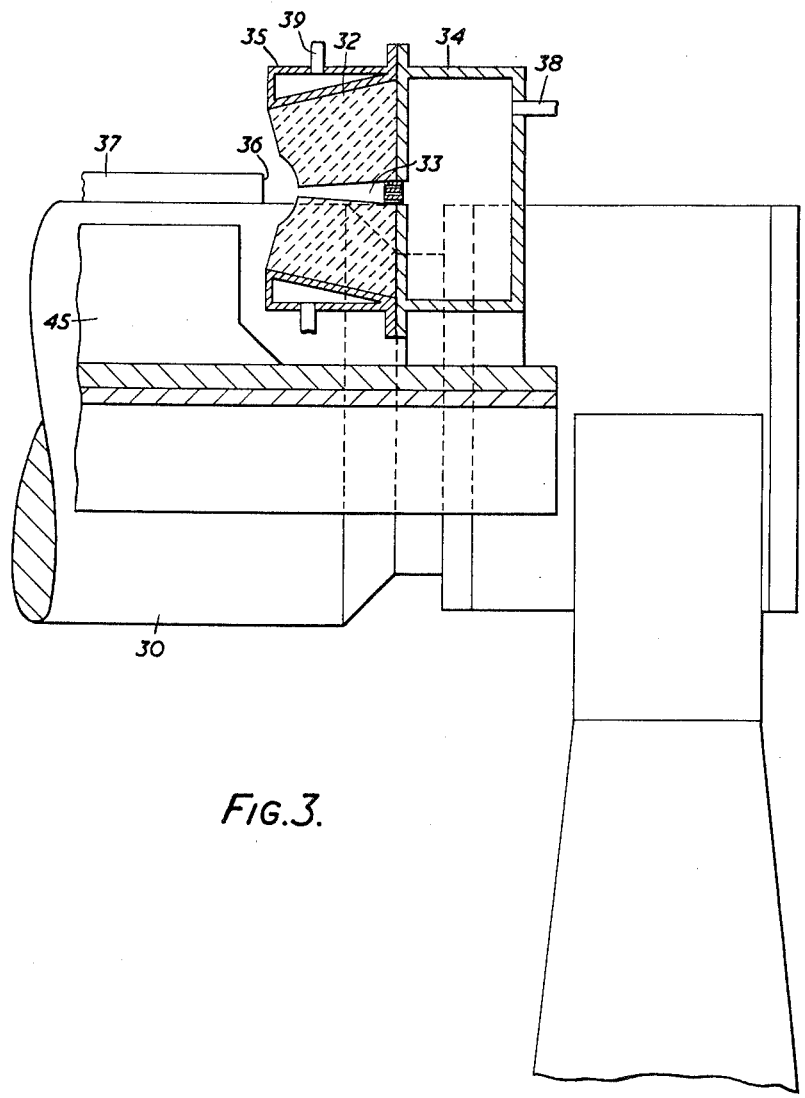

The invention will be more readily understood by way of example from the following description of a trimming and annealing line in accordance therewith, reference being made to the accompanying drawings, in which FIGURE 1 is a plan view of the line,
FIGURE 2 is a section on the line II—II of FIGURE 1, and
FIGURE 3 is a section, on enlarged scale, on the line III—III of FIGURE 1.

Referring to FIGURES 1 and 2, the line comprises a receiving roller table 12 constituted by rollers 13 driven by motors 14 and located with their axes normal to edge guides 15. The receiving table 12 leads the plate stock to rotary trimmers indicated generally at 16, 17, and followed by scrap choppers 18. The rotary trimmer 17 is fixed laterally, whereas the trimmer 16 is adjustable in relation to the fixed trimmer 17. After passing the scrap chopper 18, which removes the trimmed edges of the plate, the plate passes onto a run-out table 20 which is similar to the receiving table 12. The run-out table 20 carries the plate stock to edge heaters 21, 22 located on opposite sides of the plate, the heaters 21 being fixed and the heaters 22 being adjustable parallel to the line of annealers 21, in order to accommodate different widths of plate. After leaving the heaters 21, 22 which heat the edges of the plate while the plate is moving, the plate is carried away on the run-out table 23, which is similar to the tables 12, 20.

Each of the rotary trimmers 16, 17 is similar to those customarily used in plate mills and consists of an upper disc cutter 24 carried on a rotary shaft 25, and a lower disc cutter 26, carried on shaft 25A beneath shaft 25. The lower cutters 26 are disposed laterally between the upper cutters 24, the separation of the cutters in each of the trimmers 16, 17 being a small fraction of the plate thickness. The cutters 24, 26 of a trimmer do not normally overlap but are separated vertically by a part of the plate thickness. Because of the relative disposition of the cutters, which are driven in opposite directions, the plate is supported by the lower cutters 26 and the trimmed edges of the plate are forced downwards and removed by the upper cutters 24. In addition to the disc cutters 24, 26, each trimmer has a further disc 27 secured on the upper shaft 25 between the upper cutters 24. The discs 27 are spaced from their respective upper cutters 24 by a distance of about 3 inches and each has a diameter less than that of the upper cutters, by about 60% of the thickness of the thickest plate likely to be cut. These supplementary discs 27 hold the plate down during the cutting action and reduce the tendency of the plate to bow during shearing.

The scrap choppers 18 are of the form usually found in plate mills and force downwardly the scrap trimmed from the edges of the plate, so that the scrap does not follow the trimmed plate.

The edge heaters 21, 22 are designed to heat the edges of the plate for about 2 minutes to a depth, measured from the edge 36 (FIGURE 3) of the sheet, of 0.2 to 0.4 inch. The edges of the plate are heated to a temperature in the range 550° to 750° centigrade, the actual temperature chosen being governed by the composition of the steel being cut, and is designed to recrystallise the steel at work-hardened edges. The rollers 30 on which the plate is supported when between the heaters 21, 22 are inclined to the rollers 13 of the tables 12, 20, 23, so that the plate is kept a predetermined distance from the fixed edge heaters 21.

The heaters 22 are carried on a side guard 31 over the rollers 30 are side guard 31, with the heaters 22, are adjustable transversely of the tables by means of the guides 29. The heaters 21, 22 are located between consecutive rollers 30.

Referring to FIGURE 3, each of the heaters 21, 22 comprises a nozzle 32 having a central burner opening 33 supplied with a gas-air mixture from a duct 34. Nozzle 32 is cooled by a water jacket 35 and the burner opening lies at the level of the top of the rollers 30, so that the gas flame from the burner is directed to the edge 36 of the plate shown at 37. A gas-air mixture is supplied to the duct 34 and water to the jacket 35 through supply pipes 38, 39 respectively. The structure supporting the floor plates situated between the table rollers 30 is shown at 45.

As the plate passes between the heaters 21, 22 its edges are exposed to the burners and are heated to effect recrystallisation and thus to reduce the work hardening produced by the action of the trimmers 16, 17. As a result, the plate produced by the line is less brittle and can be bent and otherwise manipulated to a greater extent than previously, without fracturing. For the same reason, plate of a greater thickness than previously can be cut by the trimmers 16, 17.

It will be appreciated that other methods of trimming the plate and of annealing the edges are possible. For example, guillotines may be employed in place of the rotary trimmers illustrated in FIGURE 1, while electric induction heaters may be substituted for the gas burners of FIGURE 3.

FIGURES 1 and 2 also illustrate a mechanism for determining the lines along which the strip is to be trimmed in order to produce from plate stock a strip of maximum width. This mechanism comprises a series of air nozzles 40 located between pairs of rollers 13 of the receiving table 12 and disposed along the line of the cutting discs 24, 26 of rotary trimmer 17. Immediately above each of the nozzles 40 is an air-operated electrical switch 41, which is actuated to the open position whenever it receives air from the nozzle 40 immediately below; when that air is cut off, the switch 41 closes. There is a similar line of nozzles and co-operating switches (not shown) aligned with the cutting discs 24, 26 of the adjustable rotary trimmer 16, the latter line of nozzles and switches being adjusted transversely with adjustment of the rotary trimmer 16.

The switches 41 and those of the rotary trimmer 16 are electrically connected to an indicator or indicators. For example, the switches 41 may be connected in series between a current source and an indicator lamp, and a similar circuit may be supplied for the switches of the rotary trimmer 16. In operation, the plate stock on the receiving table 12 and the rotary trimmer 16 are adjusted. If, at any time, the plate does not cover any of the nozzles 40, one of the switches 41 is opened and one of the indicator lamps is extinguished. Therefore, the plate (while stationary upon the roll table 12) and rotary trimmers 16, are adjusted until the maximum separation of the trimmers 16, 17 is achieved with both indicator lamps illuminated. The motors 14 are then set into operation to carry the plate to the rotary trimmers, which have automatically been set by the previous adjustment.

Other mechanisms for indicating the lines along which the plate is to be trimmed may be employed in place of the nozzles and switches illustrated in FIGURES 1 and 2. In fact, any mechanism which is adjustable transversely and which can indicate lines covered by the plate may be employed. For example, the nozzles 40 and switches 41 may be replaced by sources of light directed onto photocells. Again, the nozzles 40 may be located closely adjacent the line of travel of the strip and may be supplied with compressed air through a restriction; if all the nozzles are covered by the plate, there is a relatively high pressure within each nozzle, whereas if one or more of the nozzles is uncovered, the pressure within those nozzles is reduced and this may be arranged to operate a convenient indicator.

*Example*

A sheet of carbon steel having a thickness of ¾ inch and a carbon content of 0.2% was edge trimmed at a temperature of 200° C. using rotary trimmers as illustrated in the drawings. The hardness of the sheet in the near vicinity of the trimmed edges was measured and found to be 280 Vickers diamond; the hardness of the "as rolled" plate before trimming was 145 Vickers diamond.

The cut edges were immediately heat treated using burners as illustrated. Each edge was raised to a temperature of 550° C. for two minutes, this temperature subsisting to a penetration of 0.5 inch from the edge itself. After cooling, the hardness of the edges was again measured and found to be 150 Vickers diamond. On passage of the sheet through roller levellers, no edge cracking occurred.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In a method of shearing sheets of steel, the steps of mechanically cutting the sheet to produce at least one side edge, and immediately thereafter heating the cut edge to recrystallisation temperature to reduce the hardness produced by the cutting operation.

2. In a method of shearing sheets of carbon and alloy steels containing carbon in the range 0.05% to 0.80%, the steps of mechanically cutting the sheet to produce at least one side edge, and thereafter heating the cut edge to a sub-critical temperature between 550° C. and 750° C. to reduce the hardness produced by the cutting operation.

3. In a method of shearing plate of carbon and alloy steels containing carbon in the range of 0.05% to 0.80% and including ferritic and martensitic stainless steels, the steps of mechanically cutting the plate to produce at least one side edge, immediately thereafter passing the cut edge past a heat source, and thereby heating only the cut edge to a sub-critical temperature between 550° C. and 750° C. to reduce the hardness produced by the cutting operation.

4. In a method of cutting plate of at least ¾ inch thickness and composed of carbon and alloy steels containing carbon in the range 0.05% to 0.80% and including ferritic and martensitic stainless steel, the steps of mechanically cutting the plate to produce at least one side edge, immediately thereafter passing the cut edge past a heat source, and thereby heating only the cut edge to a sub-critical temperature between 550° C. and 750° C. to reduce the hardness produced by the cutting operation.

5. In a method of cutting plate of at least ¾ inch thickness and composed of carbon and alloy steels containing carbon in the range 0.05% and 0.80% and including ferritic and martensitic stainless steel, the steps of mechanically cutting the plate to produce at least one side edge, and immediately thereafter raising the edge of the plate to a depth of at least 0.2 inch from the cut edge to a sub-critical temperature between 550° C. and 750° C. to reduce the hardness produced by the cutting operation.

6. A method of cutting plate of at least ¾ inch thickness and composed of carbon and alloy steels containing carbon in the range 0.05% and 0.80% and including ferritic and martensitic stainless steel, the method comprising the steps of moving the plate past a rotary trimmer and thereby cutting at least one side edge of the plate, immediately thereafter moving the plate past a heat source directed on the cut edge, and thereby raising the edge of the plate to a depth of at least 0.2 inch from the cut edge to a sub-critical temperature between 550° C. and 750° C. to reduce the hardness produced by the cutting operation.

7. A method of cutting plate of at least ¾ inch thickness and composed of carbon and alloy steels containing carbon in the range 0.05% and 0.80% and including ferritic and martensitic stainless steel, the method comprising the steps of mechanically cutting the plate to produce at least one side edge, heating the cut edge for the order of 2 minutes, and thereby raising the edge to a depth of at least 0.2 inch from the cut edge to a sub-critical temperature between 550° C. and 750° C. to reduce the hardness produced by the cutting operation.

References Cited by the Examiner
UNITED STATES PATENTS

| | | | |
|---|---|---|---|
| 337,981 | 3/1886 | Mower | 266—3 |
| 2,038,415 | 4/1936 | Claisse | 148—12 |
| 2,444,788 | 7/1948 | Reichenbach | 148—12 |
| 2,957,688 | 10/1960 | Luecke | 266—3 |

DAVID L. RECK, *Primary Examiner.*